(12) United States Patent
Cheng

(10) Patent No.: US 8,659,719 B2
(45) Date of Patent: Feb. 25, 2014

(54) DISPLAY DEVICE

(75) Inventor: Ching-Hung Cheng, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 151 days.

(21) Appl. No.: 12/976,984

(22) Filed: Dec. 22, 2010

(65) Prior Publication Data

US 2012/0113349 A1 May 10, 2012

(30) Foreign Application Priority Data

Nov. 8, 2010 (TW) .............................. 99138310 A

(51) Int. Cl.
*G02F 1/1333* (2006.01)
*G02F 1/1335* (2006.01)

(52) U.S. Cl.
USPC ................................. 349/60; 349/58; 349/96

(58) Field of Classification Search
USPC ..................................................... 349/58–65
See application file for complete search history.

(56) References Cited

U.S. PATENT DOCUMENTS

| 8,189,133 | B2 * | 5/2012 | Aaltonen | 349/58 |
| 8,212,957 | B2 * | 7/2012 | Nakanishi | 349/58 |
| 2008/0111941 | A1 * | 5/2008 | Sun | 349/58 |
| 2010/0182529 | A1 | 7/2010 | Nakanishi | |

FOREIGN PATENT DOCUMENTS

| TW | I256499 | 6/2006 |
| TW | 200831994 | 8/2008 |

* cited by examiner

*Primary Examiner* — Dung Nguyen
(74) *Attorney, Agent, or Firm* — Winston Hsu; Scott Margo

(57) ABSTRACT

A display device includes a front casing, a back casing, a backlight module and a display panel. The back casing is connected to the front casing. The backlight module is disposed between the front casing and the back casing. The backlight module includes a bezel fixed on the back casing. The display panel is disposed between the front casing and the back casing and disposed on the backlight module. The display panel includes an optical film. The optical film has a first fixing portion, wherein the first fixing portion is extended out of an edge of the bezel and fixed on the back casing.

21 Claims, 8 Drawing Sheets

DISPLAY DEVICE

BACKGROUND OF THE INVENTION

1. Field of the Invention

The invention relates to a display device and, more particularly, to a display device capable of fixing a display panel on a back casing effectively.

2. Description of the Prior Art

Referring to FIG. 1, FIG. 1 is a partial sectional view illustrating a display device 1 of the prior art. As shown in FIG. 1, the display device 1 comprises a back casing 10, a backlight module 12 and a display panel 14. The backlight module comprises a bezel 120, a plastic frame 122 and an optical film assembly 124. The bezel 120 can be fixed on the back casing 10 by screws. The optical film assembly may comprise at least one diffusion sheet and at least one prism sheet. The plastic frame 122 and the optical film assembly 124 are disposed in the bezel 120. The plastic frame 122 is disposed at a periphery of the optical film assembly 124. The display panel 14 maybe a liquid crystal display (LCD) panel and comprises a polarizer sheet 140, wherein the polarizer sheet 140 is located at a top of the display panel 14. The display panel 14 is disposed on the plastic frame 122. As shown in FIG. 1, the display panel 14 only abuts against the plastic frame 122 of the backlight module 12 and is located within the bezel 120 of the backlight module 12 wholly.

In general, the display device 1 has to pass shock test before leaving the factory. Since the display panel 14 only abuts against the plastic frame 122 of the backlight module 12, the display panel 14 may shift or rub against the plastic frame 122 during shock test. Furthermore, the periphery of a glass substrate of the display panel 14 may receive great impact force, such that the adhesion of a black matrix (BM) around the display panel 14 may be affected and then the black matrix may peel. Consequently, liquid crystal (LC) bubble may occur.

SUMMARY OF THE INVENTION

Therefore, one objective of the invention is to provide a display device capable of fixing a display panel on a back casing effectively, so as to solve the aforesaid problem.

According to one embodiment of the invention, a display device comprises a front casing, a back casing, a backlight module and a display panel. The back casing is connected to the front casing. The backlight module is disposed between the front casing and the back casing. The backlight module comprises a bezel fixed on the back casing. The display panel is disposed between the front casing and the back casing and disposed on the backlight module. The display panel comprises an optical film. The optical film has a first fixing portion, wherein the first fixing portion is extended out of an edge of the bezel and fixed on the back casing.

As mentioned in the above, the invention forms a fixing portion on the optical film of the display panel, wherein the fixing portion is extended out of the edge of the bezel of the backlight module and fixed on the back casing. In general, the optical film is attached on a glass substrate of the display panel, so the display panel can be fixed stably on the backlight module after the optical film is fixed on the back casing. Accordingly, the invention can prevent a black matrix around the display panel from peeling during shock test, so as to prevent LC bubble from occurring effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
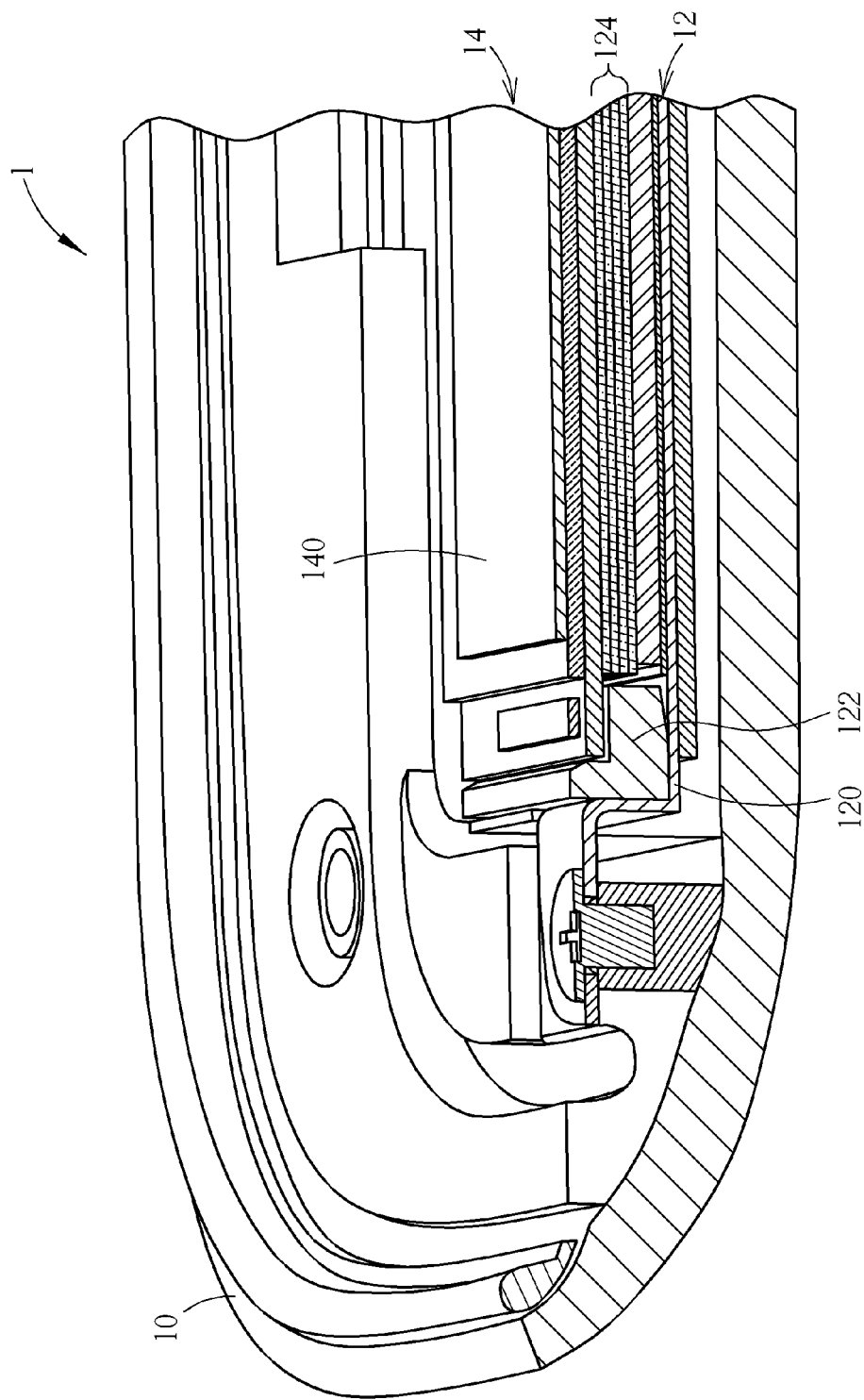
FIG. 1 is a partial sectional view illustrating a display device of the prior art.
Figure 2:
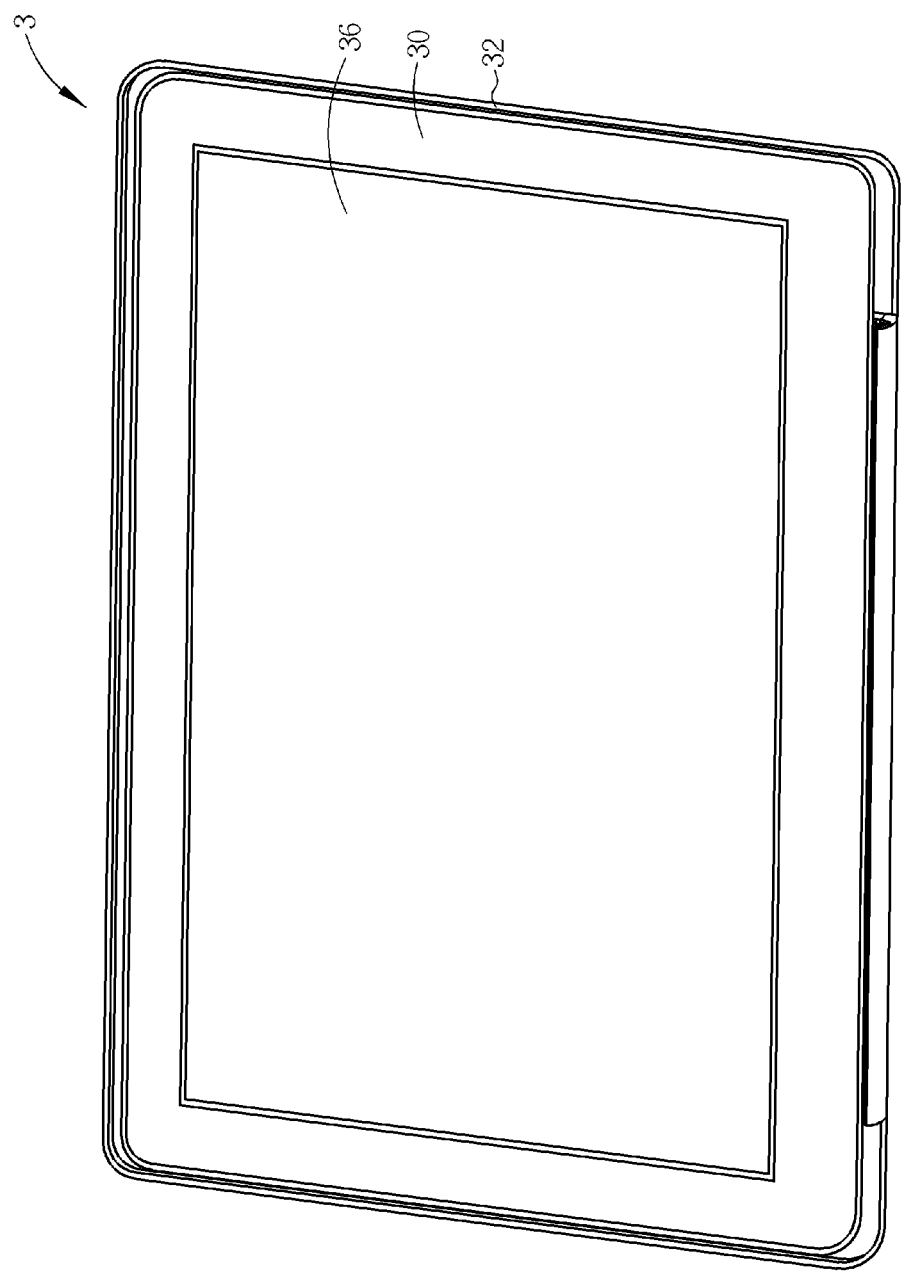
FIG. 2 is a perspective view illustrating a display device according to one embodiment of the invention.
Figure 3:
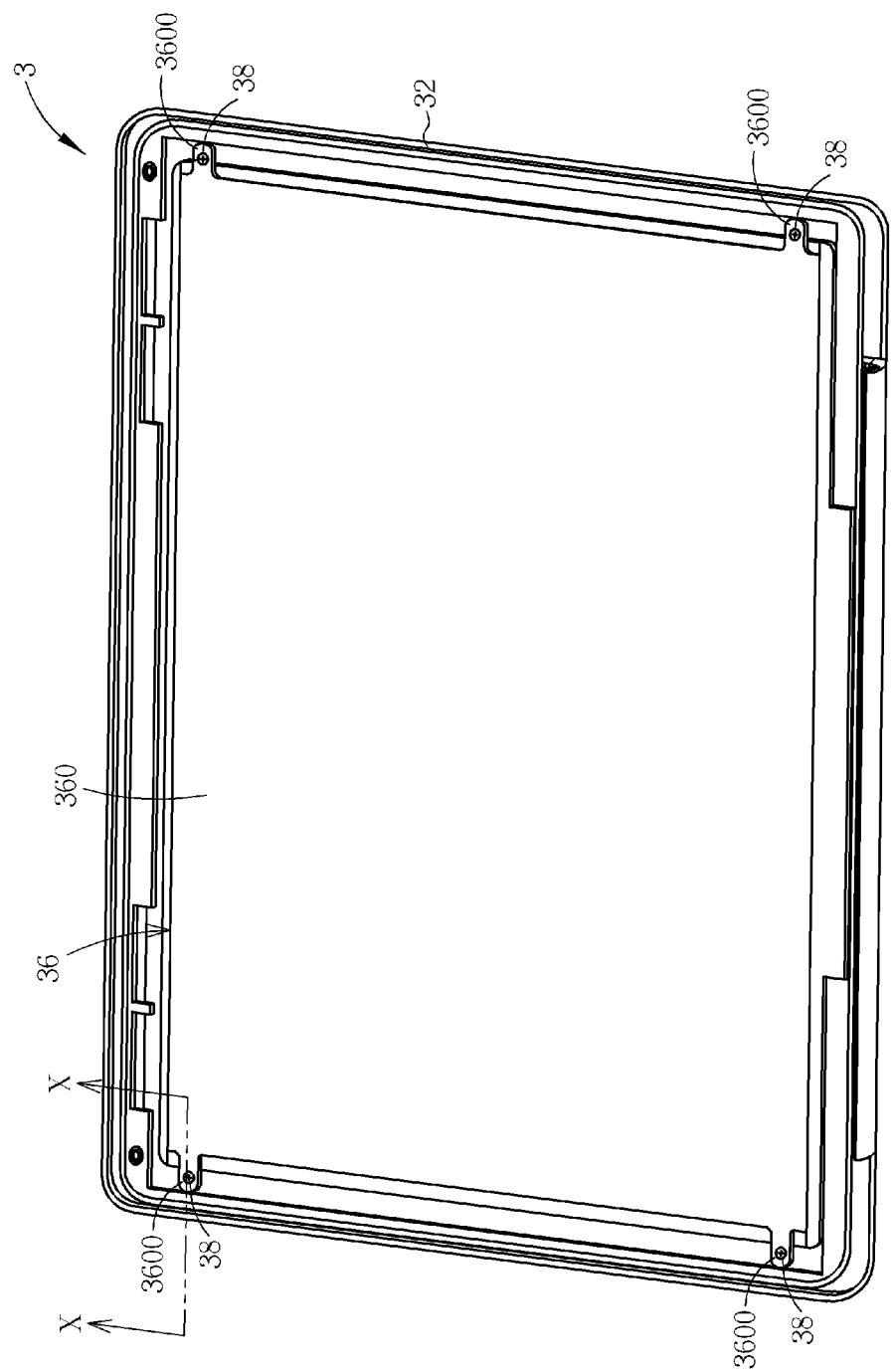
FIG. 3 is a perspective view illustrating the display device of FIG. 2 without the front casing.
Figure 4:
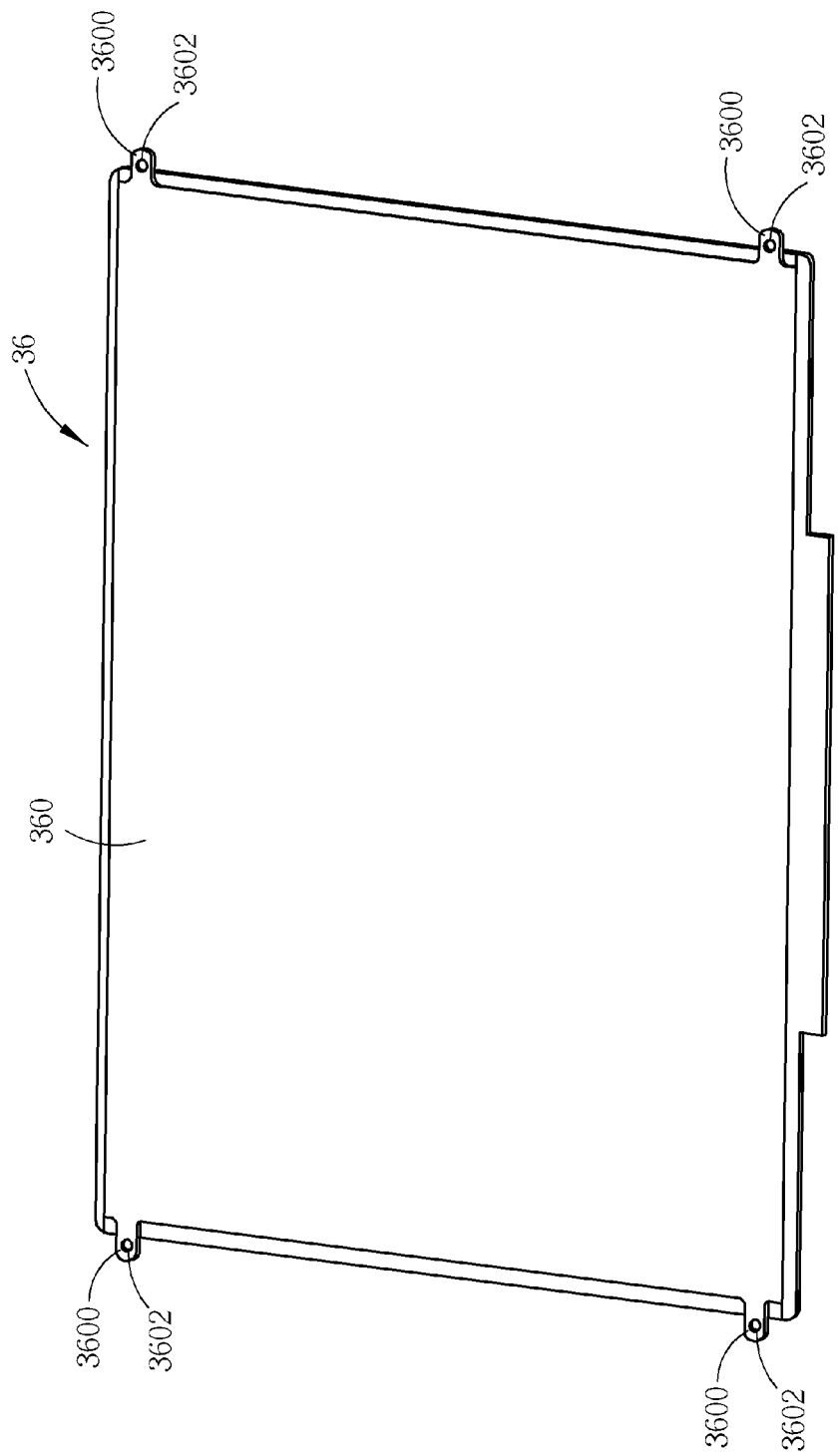
FIG. 4 is a perspective view illustrating the display panel of FIG. 3.
Figure 5:
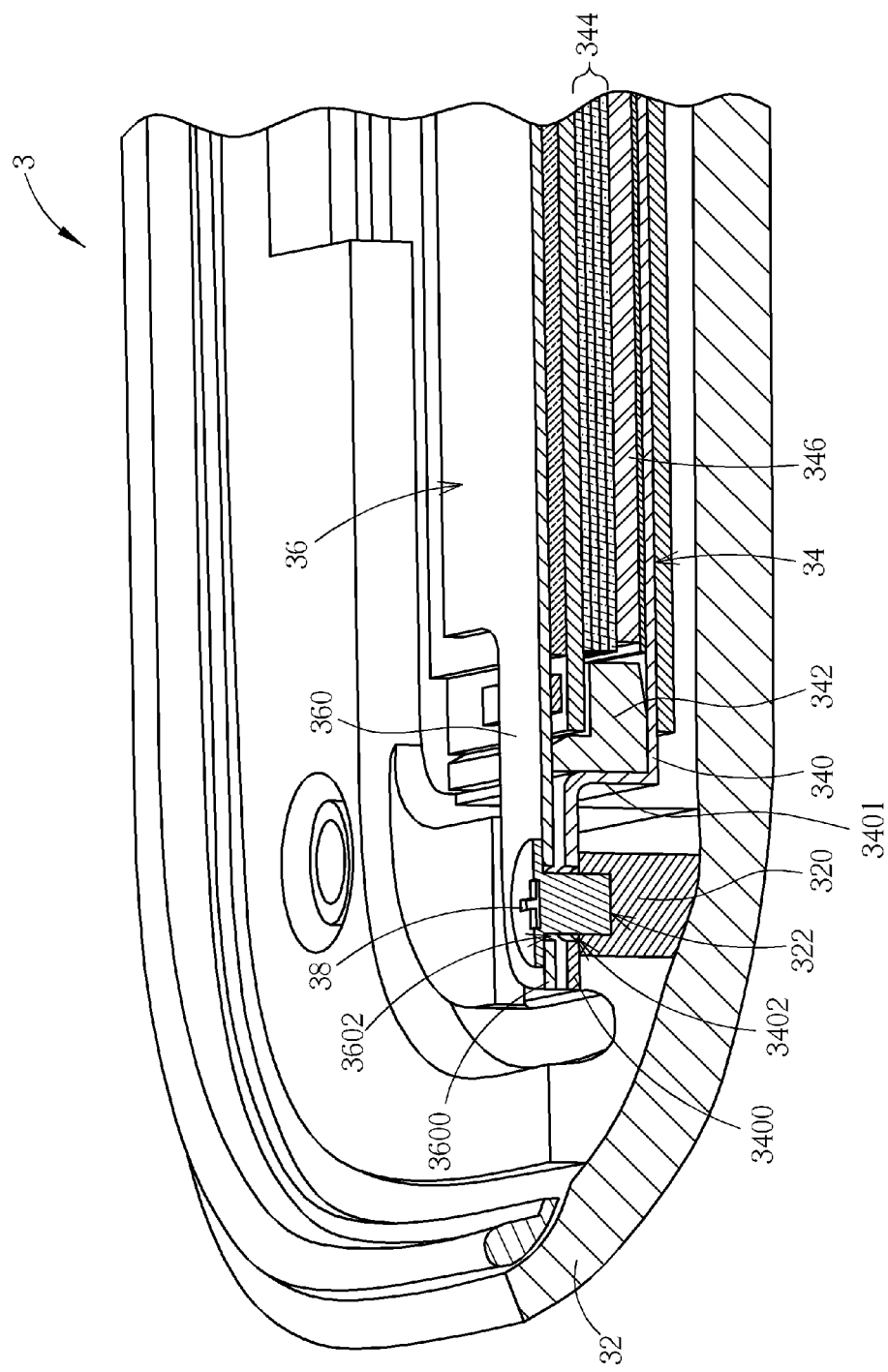
FIG. 5 is a partial sectional view illustrating the display device of FIG. 3 along line X-X.
Figure 6:
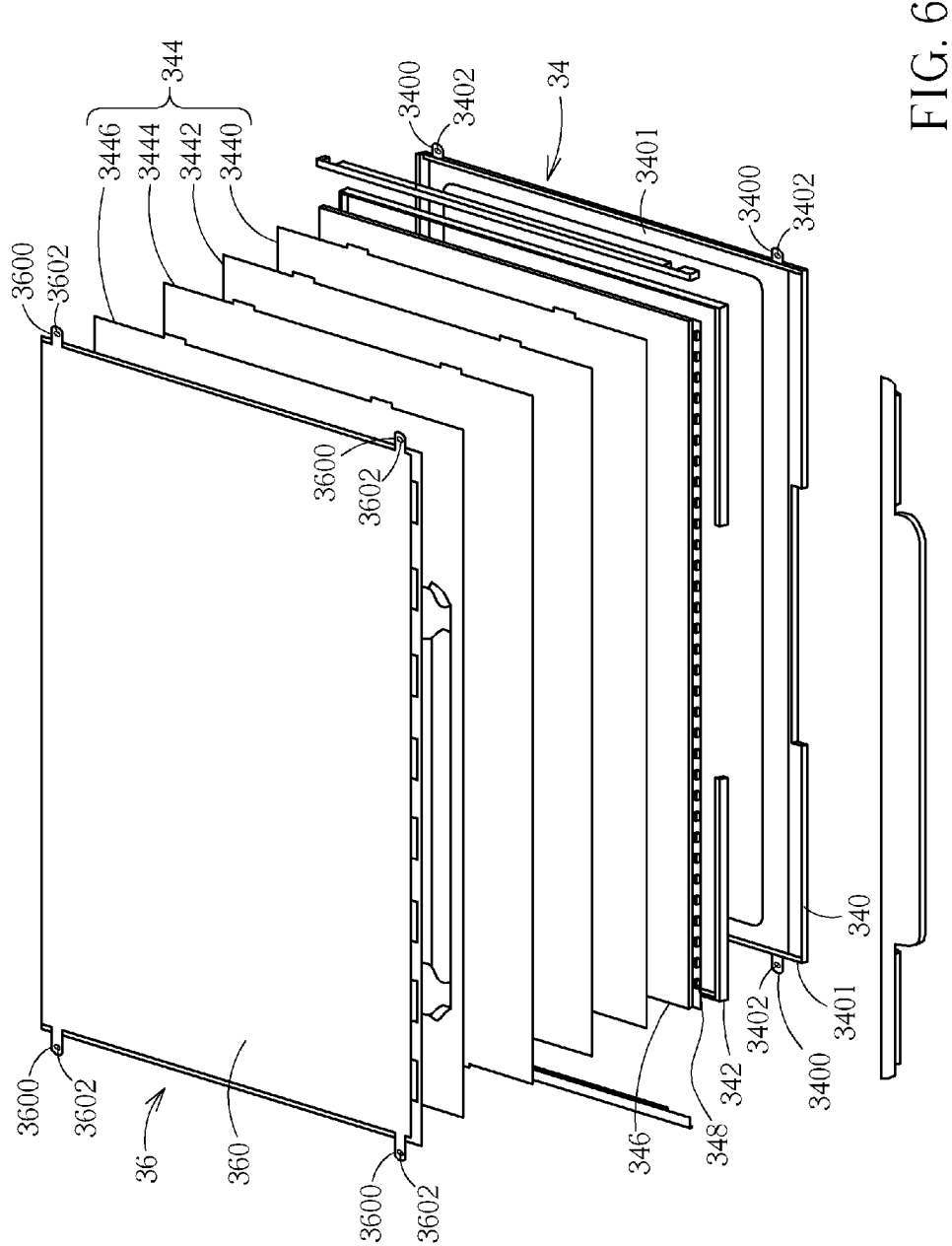
FIG. 6 is an exploded view illustrating the backlight module and the display panel of FIG. 5.

Referring to FIGS. 2 to 6, FIG. 2 is a perspective view illustrating a display device 3 according to one embodiment of the invention, FIG. 3 is a perspective view illustrating the display device 3 of FIG. 2 without the front casing 30, FIG. 4 is a perspective view illustrating the display panel 36 of FIG. 3, FIG. 5 is a partial sectional view illustrating the display device 3 of FIG. 3 along line X-X, and FIG. 6 is an exploded view illustrating the backlight module 34 and the display panel 36 of FIG. 5. As shown in FIGS. 2 to 6, the display device 3 comprises a front casing 30, a back casing 32, a backlight module 34 and a display panel 36. The back casing 32 is connected to the front casing 30. The backlight module 34 and the display device 36 are disposed between the front casing 30 and the back casing 32. The display panel 36 is disposed on the back light module 34 (i.e. the display panel 36 is located at the front of the backlight module 34).

As shown in FIG. 6, the backlight module 34 comprises a bezel 340, a plastic frame 342, an optical film assembly 344, a light guide plate 346 and a light source 348. As shown in FIGS. 3 to 6, the bezel 340 is fixed on the back casing 32. The plastic frame 342, the optical film assembly 344, the light guide plate 346 and the light source 348 are disposed in the bezel 340. The light guide plate 346 is disposed under the optical film assembly 344. The light source is disposed beside the light guide plate 346. The plastic frame 342 is disposed at the periphery of the optical film assembly 344 and the light guide plate 346. The display panel 36 is disposed on the plastic frame 342 and covers the optical film assembly 344. It should be noted that the aforesaid backlight module 34 may be replaced by a direct backlight module. The main difference between the direct backlight module and the aforesaid backlight module 34 is that the direct backlight module does not comprise the light guide plate and the light source of the direct backlight module is disposed under the optical film assembly. The direct backlight module can be achieved by one skilled in the art easily, so it will not be depicted herein.

In practical applications, the optical film assembly 344 may comprise a lower diffusion sheet 3440, a lower prism sheet 3442, an upper prism sheet 3444 and an upper diffusion sheet 3446, as shown in FIG. 6. The lower prism sheet 3442 is disposed on the lower diffusion sheet 3440, the upper prism sheet 3444 is disposed on the lower prism sheet 3442, and the upper diffusion sheet 3446 is disposed on the upper prism sheet 3444. It should be noted that the number and type of the optical films of the optical film assembly 344 can be determined based on practical applications and are not limited to the embodiment shown in FIG. 6.

The display panel 36 may be an LCD panel and comprises an optical film 360. In this embodiment, the optical film 360 may be a polarizer sheet located at a top of the display panel 36. In general, the optical film 360 is attached on a glass substrate (not shown) of the display panel 36. The optical film 360 has a first fixing portion 3600, wherein the first fixing portion is extended out of an edge 3401 of the bezel 340 of the backlight module 34 and fixed on the back casing 32. The first fixing portion 3600 can be fixed on the back casing 32 by screwing manner, adhesive manner, engaging manner or riveting manner. Furthermore, the edge 3401 of the bezel 340 of the backlight module 34 has a second fixing portion 3400, wherein the second fixing portion 3400 is also fixed on the back casing 32. The second fixing portion 3400 can be also fixed on the back casing 32 by screwing manner, adhesive manner, engaging manner or riveting manner. In practical applications, four first fixing portions 3600 may be formed on opposite sides of the optical film 360, so as to be corresponding to four second fixing portions 3400 formed on opposite sides of the bezel 340.

As shown in FIG. 5, the first fixing portion 3600 and the second fixing portion 3400 can be fixed on the back casing 32 by a fixing member 38 (e.g. screw or rivet). The back casing 32 has a third fixing portion 320. The first fixing portion 3600 has a first fixing hole 3602, the second fixing portion 3400 has a second fixing hole 3402, and the third fixing portion 320 has a third fixing hole 322. To assemble the back casing 32, the backlight module 34 and the display panel 36, an operator has to make the first fixing portion 3600 and the second fixing portion 3400 overlap each other and align the first fixing hole 3602, the second fixing hole 3402 and the third fixing hole 322. Afterward, the operator makes the fixing member 38 pass through the first fixing hole 3602, the second fixing hole 3402 and the third fixing hole 322, so as to fix the first fixing portion 3600 and the second fixing portion 3400 on the third fixing portion 320. At this time, the first fixing portion 3600 and the second fixing portion 3400 both are located out of the plastic frame 342 of the backlight module 34.

In another embodiment, the first fixing portion 3600 and the second fixing portion 3400 can be adhered to each other partially or wholly and then be fixed on the back casing 32 together. In other words, the fixing manner for the first fixing portion 3600 and the second fixing portion 3400 is not limited to the embodiment shown in FIG. 5.

Figure 7:
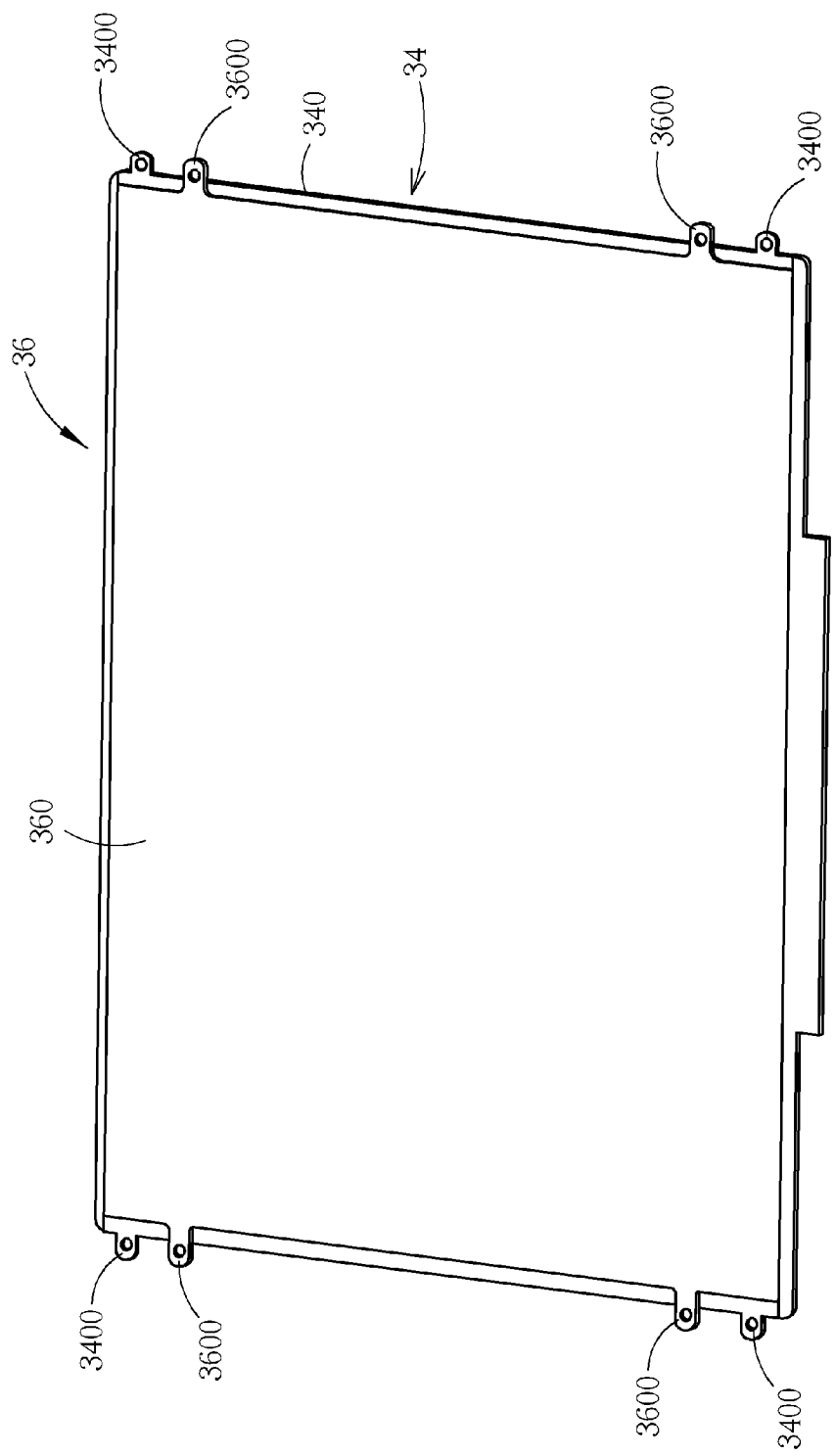
FIG. 7 is a schematic diagram illustrating the backlight module and the display panel according to another embodiment of the invention.

Referring to FIG. 7, FIG. 7 is a schematic diagram illustrating the backlight module 34 and the display panel 36 according to another embodiment of the invention. As shown in FIG. 7, the first fixing portion 3600 of the optical film 360 of the display panel 36 and the second fixing portion 3400 of the bezel 340 of the backlight module 34 are staggered. Thus, the first fixing portion 3600 and the second fixing portion 3400 can be fixed on different positions of the back casing 32 respectively by different fixing manners. For example, the first fixing portion 3600 may be adhered on the back casing 32 and the second fixing portion 3400 may be fixed on the back casing 32 by a screw. In another case, the back casing 32 may have an engaging structure for engaging the first fixing portion 3600 and the second fixing portion 3400 may be fixed on the back casing by a rivet.

Figure 8:
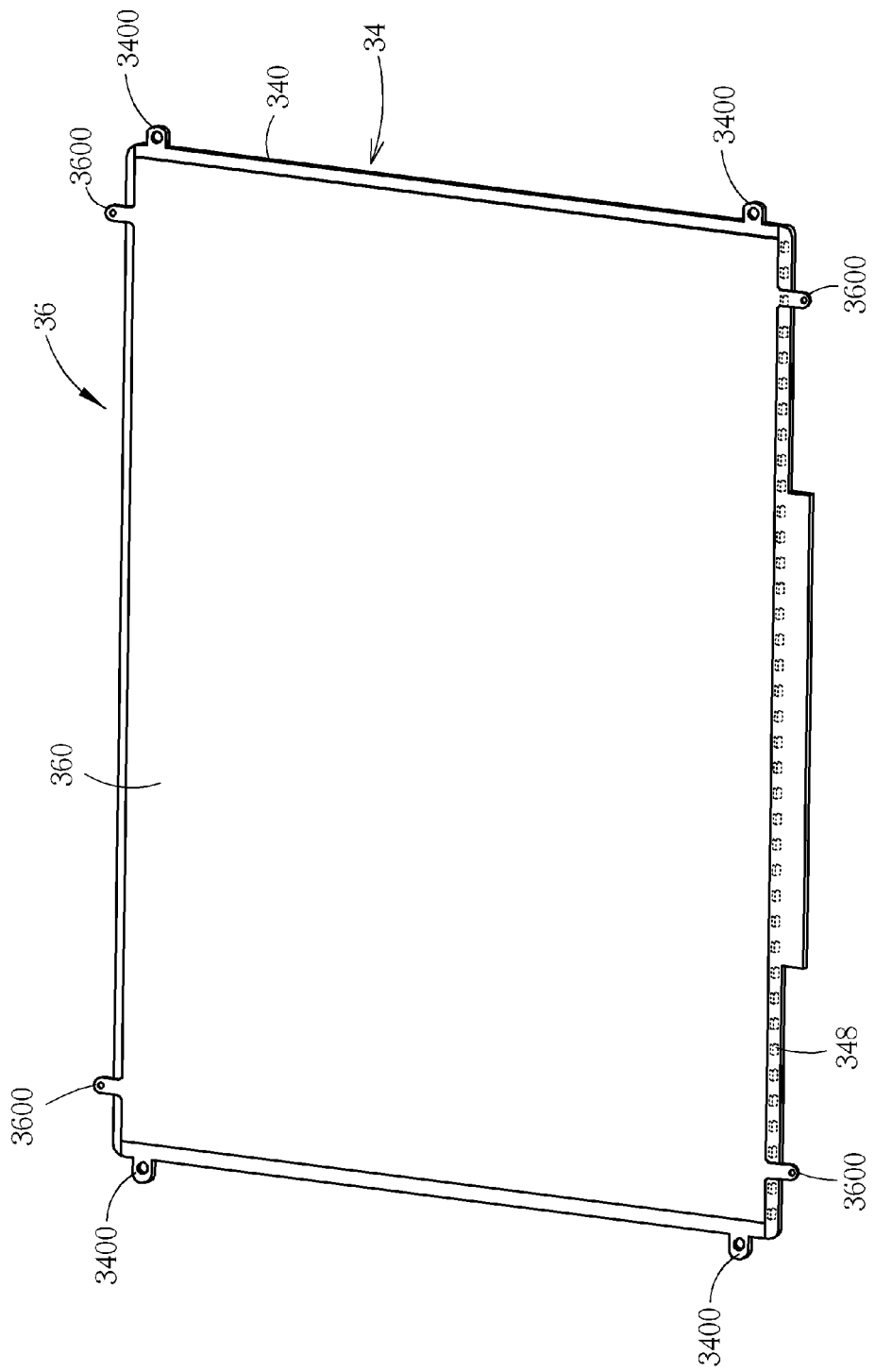
FIG. 8 is a schematic diagram illustrating the backlight module and the display panel according to another embodiment of the invention.

Referring to FIG. 8, FIG. 8 is a schematic diagram illustrating the backlight module 34 and the display panel 36 according to another embodiment of the invention. As shown in FIG. 8, four second fixing portions 3400 are extended from opposite sides of the bezel 340 of the backlight module 34, and four first fixing portions 3600 of the optical film 360 of the display panel 36 are extended out of the other opposite sides of the bezel 340 of the backlight module 34. Thus, the first fixing portion 3600 and the second fixing portion 3400 can be fixed on different positions of the back casing 32 respectively by different fixing manners. Furthermore, the first fixing portions 3600 cross over the light source 348.

Compared to the prior art, the invention forms a fixing portion on the optical film of the display panel, wherein the fixing portion is extended out of the edge of the bezel of the backlight module and fixed on the back casing. In general, the optical film is attached on a glass substrate of the display panel, so the display panel can be fixed stably on the backlight module after the optical film is fixed on the back casing. Accordingly, the invention can prevent a black matrix around the display panel from peeling during shock test, so as to prevent LC bubble from occurring effectively.

Those skilled in the art will readily observe that numerous modifications and alterations of the device and method may be made while retaining the teachings of the invention.

What is claimed is:

1. A display device comprising:
a front casing;
a back casing connected to the front casing;
a backlight module disposed between the front casing and the back casing, the backlight module comprising a bezel fixed on the back casing; and
a display panel disposed between the front casing and the back casing and disposed on the backlight module, the display panel comprising an optical film, the optical film having a first fixing portion extended out of an edge of the bezel and fixed on the back casing, the edge of the bezel having a second fixing portion fixed on the back casing, the first and second fixing portions overlapping each other, the optical film and the first fixing portion being formed integrally.

2. The display device of claim 1, wherein the first fixing portion is fixed on the back casing by a fixing manner selected from a group consisting of: screwing manner, adhesive manner, engaging manner and riveting manner.

3. The display device of claim 1, wherein the second fixing portion is fixed on the back casing by a fixing manner selected from a group consisting of: screwing manner, adhesive manner, engaging manner and riveting manner.

4. The display device of claim 1, further comprising a fixing member, the back casing having a third fixing portion, the first fixing portion having a first fixing hole, the second fixing portion having a second fixing hole, the third fixing portion having a third fixing hole, the first, second and third fixing holes being aligned with each other, the fixing member passing through the first, second and third fixing holes so as to fix the first and second fixing portions on the third fixing portion.

5. The display device of claim 1, wherein the first and second fixing portions are adhered to each other partially or wholly.

6. The display device of claim 1, wherein the optical film is a polarizer sheet located at a top of the display panel.

7. The display device of claim 6, wherein the backlight module further comprises a plastic frame and an optical film assembly disposed in the bezel, the plastic frame is disposed at a periphery of the optical film assembly, and the display panel is disposed on the plastic frame and covers the optical film assembly.

8. The display device of claim 7, wherein the first fixing portion is located out of the plastic frame.

9. A display device comprising:
a front casing;
a back casing connected to the front casing;
a backlight module disposed between the front casing and the back casing, the backlight module comprising a bezel fixed on the back casing; and
a display panel disposed between the front casing and the back casing and disposed on the backlight module, the display panel comprising an optical film, the optical film being a polarizer sheet located at a top of the display panel, the optical film having a first fixing portion extended out of an edge of the bezel and fixed on the back casing, the optical film and the first fixing portion being formed integrally.

10. The display device of claim 9, wherein the first fixing portion is fixed on the back casing by a fixing manner selected from a group consisting of: screwing manner, adhesive manner, engaging manner and riveting manner.

11. The display device of claim 9, wherein the edge of the bezel has a second fixing portion fixed on the back casing.

12. The display device of claim 11, wherein the second fixing portion is fixed on the back casing by a fixing manner selected from a group consisting of: screwing manner, adhesive manner, engaging manner and riveting manner.

13. The display device of claim 11, wherein the first and second fixing portions overlap each other.

14. The display device of claim 13, further comprising a fixing member, the back casing having a third fixing portion, the first fixing portion having a first fixing hole, the second fixing portion having a second fixing hole, the third fixing portion having a third fixing hole, the first, second and third fixing holes being aligned with each other, the fixing member passing through the first, second and third fixing holes so as to fix the first and second fixing portions on the third fixing portion.

15. The display device of claim 13, wherein the first and second fixing portions are adhered to each other partially or wholly.

16. The display device of claim 9, wherein the backlight module further comprises a plastic frame and an optical film assembly disposed in the bezel, the plastic frame is disposed at a periphery of the optical film assembly, and the display panel is disposed on the plastic frame and covers the optical film assembly.

17. The display device of claim 16, wherein the first fixing portion is located out of the plastic frame.

18. A display device comprising:
a front casing;
a back casing connected to the front casing;
a backlight module disposed between the front casing and the back casing, the backlight module comprising a bezel fixed on the back casing; and
a display panel disposed between the front casing and the back casing and disposed on the backlight module, the display panel comprising an optical film, the optical film having a first fixing portion extended out of an edge of the bezel and fixed on the back casing, the edge of the bezel having a second fixing portion fixed on the back casing, the first and second fixing portions overlapping each other.

19. A display device comprising:
a front casing;
a back casing connected to the front casing;
a backlight module disposed between the front casing and the back casing, the backlight module comprising a bezel fixed on the back casing; and
a display panel disposed between the front casing and the back casing and disposed on the backlight module, the display panel comprising an optical film, the optical film being a polarizer sheet located at a top of the display panel, the optical film having a first fixing portion extended out of an edge of the bezel and fixed on the back casing.

20. A display device comprising:
a front casing;
a back casing connected to the front casing;
a backlight module disposed between the front casing and the back casing, the backlight module comprising a bezel fixed on the back casing; and
a display panel disposed between the front casing and the back casing and disposed on the backlight module, the display panel comprising an optical film, the optical film being capable of polarizing light and located at a top of the display panel, the optical film having a first fixing portion extended out of an edge of the bezel and fixed on the back casing.

21. A display device comprising:
a front casing;
a back casing connected to the front casing;
a backlight module disposed between the front casing and the back casing, the backlight module comprising a bezel fixed on the back casing; and
a display panel disposed between the front casing and the back casing and disposed on the backlight module, the display panel comprising an optical film, the optical film having a polarizing layer and being located at a top of the display panel, the optical film having a first fixing portion extended out of an edge of the bezel and fixed on the back casing.

\* \* \* \* \*